US 8,068,681 B2

(12) United States Patent
Cheng et al.

(10) Patent No.: US 8,068,681 B2
(45) Date of Patent: Nov. 29, 2011

(54) METHOD AND SYSTEM FOR PIPELINED PROCESSING IN AN INTEGRATED EMBEDDED IMAGE AND VIDEO ACCELERATOR

(75) Inventors: Taiyi Cheng, San Jose, CA (US); Mark Hahm, Hartland, WI (US); Li Fung Chang, Holmdel, NJ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/839,591

(22) Filed: Jul. 20, 2010

(65) Prior Publication Data

US 2011/0013851 A1      Jan. 20, 2011

Related U.S. Application Data

(63) Continuation of application No. 11/353,528, filed on Feb. 14, 2006, now Pat. No. 7,760,951.

(51) Int. Cl.
*G06K 9/36* (2006.01)
(52) U.S. Cl. ........................................... 382/234
(58) Field of Classification Search .......... 382/232–233, 382/235–236, 238–240, 244–250, 276, 302–304; 348/718–720; 712/22
See application file for complete search history.

(56) References Cited

U.S. PATENT DOCUMENTS

| 5,448,310 | A | 9/1995 | Kopet et al. |
|---|---|---|---|
| 5,453,945 | A | 9/1995 | Tucker et al. |
| 5,594,679 | A | 1/1997 | Iwata |
| 5,649,029 | A | 7/1997 | Galbi |
| 5,650,861 | A | 7/1997 | Nakajima et al. |
| 5,768,537 | A | 6/1998 | Butter et al. |
| 5,825,921 | A | 10/1998 | Dulong |
| 5,835,636 | A | 11/1998 | Auld |
| 5,870,497 | A | 2/1999 | Galbi et al. |
| 7,760,951 | B2 * | 7/2010 | Cheng et al. .............. 382/234 |

OTHER PUBLICATIONS

Bolton et al., "A Complete Single-Chip Implementation of the JPEG Image Compression Standard". Proceedings of the IEEE 1991 Custom Integrated Circuits Conference, May 1991, San Diego, CA, pp. 12.2.1-12.2.4.

* cited by examiner

*Primary Examiner* — Jose Couso
(74) *Attorney, Agent, or Firm* — McAndrews, Held & Malloy, Ltd.

(57) ABSTRACT

A method and system for pipelined processing in an integrated embedded image and video accelerator is described. Aspects of a system for pipelined processing in an integrated embedded image and video accelerator may include circuitry that enables pipeline processing of video data within a single chip, wherein the pipeline processing may further include decoding of a block of video data while simultaneously inverse transforming a previously decoded block of video data. Aspects of the system may also include circuitry that enables transformation, within the single chip, of a block of said video data while simultaneously encoding, within said single chip, a previously transformed block of video data.

22 Claims, 8 Drawing Sheets

METHOD AND SYSTEM FOR PIPELINED PROCESSING IN AN INTEGRATED EMBEDDED IMAGE AND VIDEO ACCELERATOR

CROSS-REFERENCE TO RELATED APPLICATIONS/INCORPORATION BY REFERENCE

This application is a continuation of U.S. application Ser. No. 11/353,528 filed Feb. 14, 2006.

This application makes reference to:
U.S. application Ser. No. 11/354,704 filed on Feb. 14, 2006;
U.S. application Ser. No. 11/353,529 filed on Feb. 14, 2006;
U.S. application Ser. No. 11/353,367 filed on Feb. 14, 2006; and
U.S. application Ser. No. 11/353,530 filed on Feb. 14, 2006.

Each of the above stated applications are hereby incorporated herein by reference in their entirety.

FIELD OF THE INVENTION

Certain embodiments of the invention relate to processing of images and video in a communication system. More specifically, certain embodiments of the invention relate to a method and system for pipelined processing in an integrated embedded image and video accelerator.

BACKGROUND OF THE INVENTION

The growing computational complexity and data rate requirements of new multimedia applications demand that signal processing systems provide efficient and flexible compression and decompression routines. With a plurality of image and video coding and decoding standards available, the signal processing system may have to be flexible enough to implement at least one of these standards. Examples of image and video coding and decoding standards that may be used in various user devices comprise Joint Photographic Experts Group (JPEG), Moving Picture Experts Group (MPEG), and H.263 standard published by the International Telecommunications Union (ITU).

The JPEG standard utilizes a lossy compression technique for compressing still images based on the discrete cosine transform (DCT) and the inverse cosine transform (IDCT) for coding and decoding operations respectively. The JPEG standard is rarely used in video, but it forms the basis for motion-JPEG (M-JPEG) which may be used in desktop video editing and digital video (DV) compression, a compression and data packing scheme used in consumer digital video cassette recorders and their professional derivatives. In the JPEG standard, an 8×8 array of sample data known as a video data block may be used for processing, where the sample data may correspond to luminance (Y) or chrominance (Cr and Cb) information of the still image or video signal. Four 8×8 blocks of luminance, an 8×8 block of Cr, and an 8×8 block of Cb data is known in JPEG terminology as a minimum coded unit (MCU) and it corresponds to a macroblock in DV or MPEG terminology.

The MPEG standard is also based on the DCT/IDCT pair and may provide intraframe or interframe compression. In interframe compression, there may be an anchor or self-contained image in a video field that provides a base value and succeeding images may be coded based on their differences to the anchor. In intraframe compression, each image in a video field is compressed or coded independently from any other image in a video sequence. The MPEG standard specifies what may constitute a legal bitstream, that is, it provides guidelines as to what is a conformant encoder and decoder but does not standardize how an encoder or a decoder may accomplish the compression or decompression operations respectively.

The H.263 standard may support video coding and decoding for video-conferencing and video-telephony application. Video-conferencing and video-telephony may have a wide range of wireless and wireline applications, for example, desktop and room based conferencing, video over the Internet and over telephone lines, surveillance and monitoring, telemedicine, and computer-based training and education. Like MPEG, the H.263 standard specifies the requirements for a video encoder and decoder but does not describe the encoder and decoder themselves. Instead, the H.263 standard specifies the format and content of the encoded bitstream. Also like MPEG and JPEG, the H.263 standard is also based on the DCT/IDCT pair for coding and decoding operations.

Some conventional image and video (IV) systems are implemented as a system on a chip (SoC). Some conventional IV SoCs utilize a pure software approach, while other conventional IV SoCs utilize a pure hardware accelerator approach. The pure software approach may achieve high flexibility and lowest silicon cost, but may consume more power than other conventional approaches. The performance of some conventional IV SoCs that utilize a pure software approach may be limited based on the performance of the processor that executes the software. The pure hardware accelerator approach is highly effective in terms of power consumption and performance in comparison to the pure software approach. However, the pure hardware accelerator approach may perform predetermined functions and may not be adaptable to performing new functions as may be required by new applications and/or new products. The pure hardware accelerator approach may also require more complex coupling with pre processing and/or post processing blocks, such as image format converters and/or color space converters, for example.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for pipelined processing in an integrated embedded image and video accelerator substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for pipelined processing in an integrated embedded image and video accelerator. Aspects of a system for pipelined processing in an integrated embedded image and video accelerator may include circuitry that enables pipeline processing of video data within a single chip. The pipeline processing may further comprise transforming, within the single chip, a block of the video data while simultaneously encoding, within the single chip, a previously transformed block of video data. At least a portion of the transforming of the block of video data may occur at a time instant that corresponds to at least a portion of the encoding of the previously transformed block of video data.

Various embodiments of the invention may comprise an integrated embedded image and video accelerator that may perform JPEG encoding and/or decoding in a pipelined, hardware-based system. In one aspect of the invention, the integrated embedded image and video accelerator that may perform image and/or video processing under software control. In this aspect, various embodiments of the invention may provide high performance and/or low power consumption, in comparison to some conventional approaches. Simultaneously, various embodiments of the invention may provide a flexible JPEG accelerator platform that may be adaptable to a wide range of new applications and/or new products, in comparison to some conventional approaches.

Figure 1:
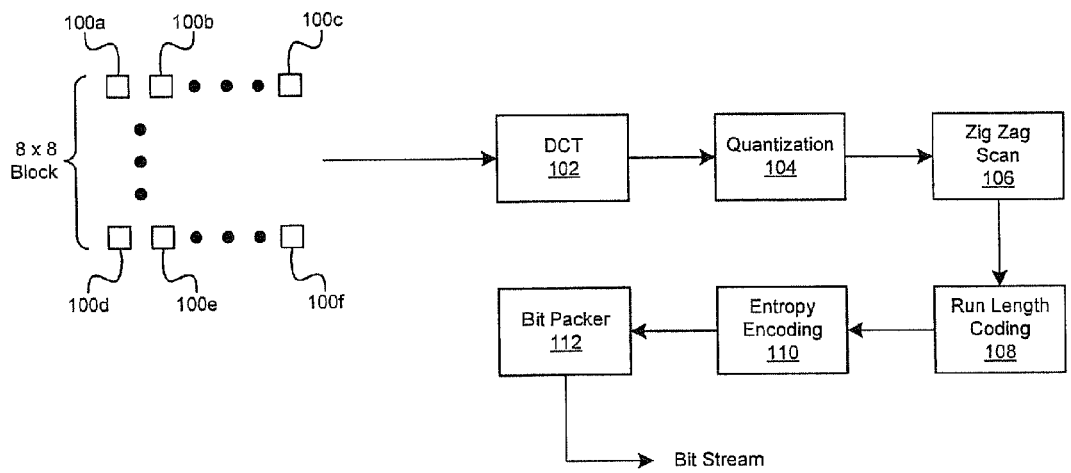
FIG. 1 is block diagram illustrating exemplary encoding process, in connection with an embodiment of the invention.

FIG. 1 is block diagram illustrating exemplary encoding process, in connection with an embodiment of the invention. Referring to FIG. 1 there is shown an 8×8 pixel block 100, a discrete cosine transform (DCT) block 102, a quantization block 104, a zig zag scan block 106, a run length coding (RLC) block 108, an entropy encoding block 110, and a bit packer block 112.

The 8×8 pixel block 100 may comprise pixels arranged in rows and columns in which each of the 8 rows may comprise 8 pixels. The pixels 100a, 100b ... 100c may represent pixels in a first row of the 8×8 pixel block 100. The pixels 100d, 100e ... 100f may represent pixels in a subsequent row of the 8×8 pixel block 100.

Each pixel in the 8×8 pixel block 100 may comprise luminance (Y), chrominance U (U) information, and/or chrominance V (V) information. The Y, U, and/or V information may correspond to a pixel in an image frame, for example. The Y, U, and/or V information associated with a pixel may be referred to as a YUV representation. The YUV representation for a pixel may be derived from a corresponding representation of the pixel as comprising red (R) information, green (G) information, and/or blue (B) information. The R information may represent an intensity level of the color red that may be present in the representation of the pixel. The G information may represent an intensity level of the color green that may be present in the representation of the pixel. The B information may represent an intensity level of the color blue that may be present in the representation of the pixel. The R, G, and/or B information associated with a pixel may be referred to as an RGB representation. Image data, associated with each pixel in an image frame may be generated by complementary metal oxide silicon (CMOS) circuitry in a camera and stored in an RGB representation in a memory. The stored RGB representation may be subsequently converted to a YUV representation by preprocessing, for example. During preprocessing Y information may be computed based on corresponding R, G, and/or B information. U information may be computed based on computed Y information and corresponding B information. V information may be computed based on computed Y information and corresponding R information.

The DCT block 102 may comprise suitable logic, circuitry and/or code that may enable discrete cosine transformation of the 8×8 pixel block 100. The DCT block 102 may enable computation of transformed values corresponding to values, for example YUV values, associated with the pixels 100a, 100b ... 100c, 100d, and 100e ... 100f, contained within the 8×8 pixel block 100. The pixels in the 8×8 pixel block 100 may comprise values associated with intensities associated with YUV information. The transformed values computed by the DCT block 102 may comprise a frequency representation of values in the YUV representation. For example, the transformed values may indicate high frequency components and low frequency components associated with the 8×8 pixel block 100. High frequency components may represent areas in the 8×8 pixel block 100 where there may be a rapid change in intensity values among pixels.

For example, areas in an image comprising high frequency components may be characterized by high visual contrast. Low frequency components may represent areas in the 8×8 pixel block 100 where there may be little to no change in intensity among pixels. In another example, areas in an image comprising low frequency components may be characterized by uniform color and/or intensity. Notwithstanding, the transformed values may comprise an 8×8 block of transformed values, for example. The resulting 8×8 block of transformed values computed by the DCT block 102 may comprise 8 rows with each row comprising a plurality of 8 transformed values, for example.

The quantization block 104 may comprise suitable logic, circuitry and/or code that may enable quantization of the transformed values computed by the DCT block 102. The quantization may comprise deriving a binary representation of the corresponding transformed value computed by the DCT block 102. The corresponding transformed value may represent a numerical value. The binary value associated with the binary representation may not be equal to the corresponding transformed value computed by the DCT block 102. A difference between the binary value and the corresponding transformed value may be referred to as quantization error. The quantization block 104 may utilize a number of bits in a binary representation based on a numerical value of the corresponding transformed value.

The zig zag scan block 106 may comprise suitable logic, circuitry and/or code that may enable selection of quantized values from a block of quantized values. For example, the zig zag scan block 106 may implement a scan of an 8×8 block of quantized values. The scan may comprise processing data associated with the 8×8 block of quantized values in a determined order. The zig zag scan block 106 may convert the representation of the quantized values from a block of 64 individual binary values, to a single concatenated string of binary values, for example. In the concatenated string of binary values, a binary value associated with the second quantized value in the 8×8 block of quantized values may be appended to a binary value associated with the first quantized value to form a single binary number, for example.

The run length coding (RLC) block 108 may comprise suitable logic, circuitry and/or code that may be utilized to reduce redundancy in the concatenated string of binary values generated by the zig zag scan block 106. If the concatenated string of binary values comprises a contiguous substring of consecutive binary '0' values, for example, the RLC block 108 may replace the contiguous substring with an alternative representation that indicates the number of consecutive binary '0' values that were contained in the original concatenated string of binary values. The alternative representation may comprise fewer binary bits than the contiguous substring. The RLC block 108 may generate a RLC bit stream.

The entropy encoding block 110 may comprise suitable logic, circuitry and/or code that may enable entropy encoding of the RLC bit stream from the RLC block 108. In one embodiment of the invention, the entropy encoding block 110 may comprise a Huffman encoder. In this regard, the entropy encoder block 110 may be referred to as a Huffman encoding block 110. Notwithstanding, the invention is not limited in this regard, and other types of entropy encoders may be utilized. In this regard, various exemplary embodiments of the invention may utilize Huffman encoding, arithmetic encoding, unary encoding, Elias gamma encoding, Fibonacci encoding, Golomb encoding, Rice encoding and/or other encoding schemes.

The RLC bit stream may comprise groups of contiguous bits, for example, 8 bits. Each group of 8 bits may correspond to a symbol. Entropy encoding may enable data compression by representing the symbol with an entropy encoded representation that comprises fewer bits. Each of the plurality of symbols may comprise an equal number of bits. Each of the plurality of symbols from the RLC bit stream may be entropy encoded to form a plurality of symbols. Each of the entropy encoded symbols may comprise a varying numbers of bits. The entropy encoded version of the RLC bit stream may comprise fewer bits than may be in the original RLC bit stream.

The bit packer block 112 may comprise suitable logic, circuitry and/or code that may enable insertion of stuff bits into the entropy encoded bit stream generated by the entropy encoding block 110. The entropy encoded bit stream may comprise a plurality of bits. That number of bits may not be an integer multiple of 8, for example. Such an entropy encoded bit stream may not be aligned to an 8 bit byte, or to a data word wherein the length of the data word is an integer multiple of 8. The bit packer block 112 may insert stuff bits into the entropy encoded bit stream such that the total of the number of bits in the entropy encoded bit stream and the number of stuff bits may be an integer multiple of 8, or an integer multiple of the number of bits in a data word. The bit stuffed version of the entropy encoded bit stream may be referred to as being byte aligned, or word aligned. The binary value of each stuff bit may be a determined value, for example, a binary '0' value.

The resulting bit stream may be stored in memory, for example.

Figure 2:
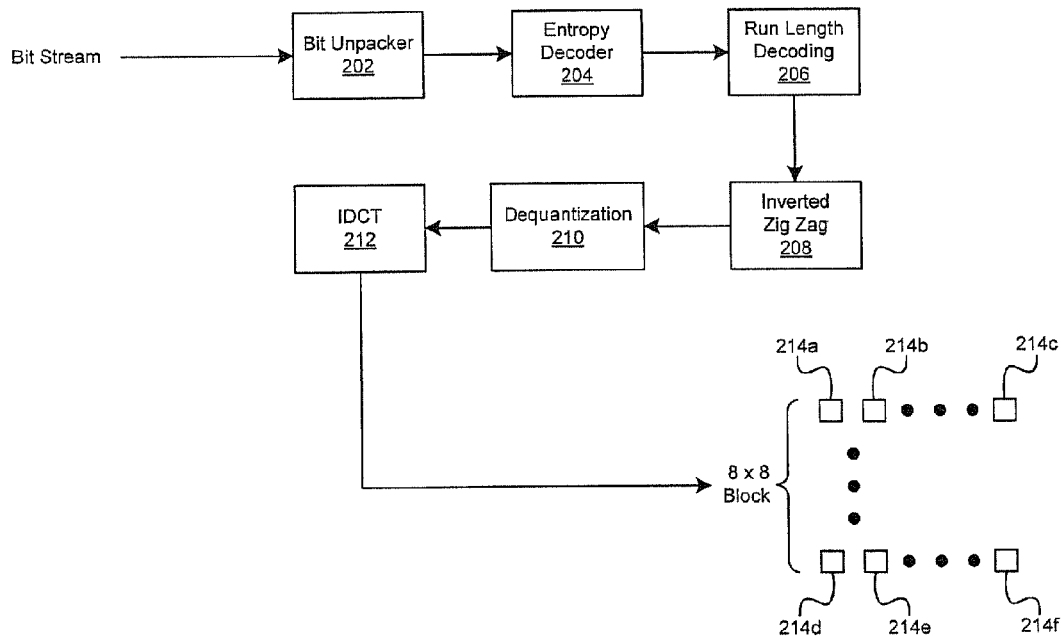
FIG. 2 is block diagram illustrating exemplary decoding process, in connection with an embodiment of the invention.

FIG. 2 is block diagram illustrating exemplary decoding process, in connection with an embodiment of the invention. Referring to FIG. 2 there is shown a bit unpacker block 202, an entropy decoder block 204, a run length decoding (RLDC) block 206, an inverted zig zag scan block 208, a de-quantization block 210, an inverse discrete cosine transform (IDCT) block 212, and an 8×8 pixel block 214.

The bit unpacker block 202 may comprise suitable logic, circuitry and/or code that may enable removal of stuffed bits from a byte-aligned bit stream. The stuff bits may have previously been inserted into the bit stream.

The entropy decoder block 204 may comprise suitable logic, circuitry and/or code that may enable entropy decoding of the bit stream received from the bit unpacker block 202. Entropy decoding may comprise a data expansion method by which a previously entropy encoded symbol is decoded. In one embodiment of the invention, the entropy decoder block 204 may comprise a Huffman decoder. In this regard, the entropy decoder block 204 may be referred to as a Huffman decoder block 204. Notwithstanding, the invention is not limited in this regard, and other types of entropy decoders may be utilized. In this regard, various exemplary embodiments of the invention may utilize Huffman decoding, arithmetic decoding, unary decoding, Elias gamma decoding, Fibonacci decoding, Golomb decoding, Rice decoding and/or other types encoding schemes.

The entropy decoder block 204 may receive a plurality of encoded symbols contained in a received bit stream. Each of the entropy encoded symbols may comprise a variable number of bits. The entropy decoder block 204 may decode each of the plurality of entropy encoded symbols to generate a corresponding plurality of entropy decoded symbols. Each of the plurality of entropy decoded symbols may comprise an equal number of bits.

The run length decoding (RLDC) block 206 may comprise suitable logic, circuitry and/or code that may enable processing of a bit stream received from the entropy decoder block 204 comprising entropy decoded symbols. The RLDC block 206 may utilize RLC information contained in the received bit stream to insert bits into the bit stream. The inserted bits may comprise a contiguous substring of consecutive binary '0' values, for example. The RLDC block 206 may generate an RLDC bit stream in which RLC information in the received bit stream may be substituted for corresponding inserted bits.

The inverted zig zag scan block 208 comprise suitable logic, circuitry and/or code that may enable processing of an RLDC bit stream received from the RLDC block 206. The inverted zig zag scan block 208 may enable conversion a single received bit stream into a plurality of binary values. For example, the RLDC may generate 64 binary values, for example. A first block of bits contained within the received bit stream may be associated with a first binary value, and a second block of bits contained within the received bit stream may be associated with a second binary value, and a last block of bits contained within the received bit stream may be associated with a $64^{th}$ binary value, for example. The plurality of binary values may be arranged in a block, for example, an 8×8 block.

The de-quantization block 210 may comprise suitable logic, circuitry and/or code that may enable processing of a received block of values from the inverted zig zag scan block 208. The de-quantization block 210 may enable inverse quantization of the received block of values. Inverse quantization may comprise determining a numerical value based on a binary value. The numerical value may comprise a base 10 representation of the corresponding binary value. The de-quantization block 210 may also enable inverse quantization for each of the binary values contained in a received block of values. The de-quantization block 210 may generate a corresponding block of numerical values.

The IDCT block 212 may comprise suitable logic, circuitry and/or code that may enable inverse transformation of a received block of numerical values from the de-quantization block 210. The received block of numerical values may comprise a frequency representation of YUV information associated with the 8×8 pixel block 214. The IDCT block 212 may perform an inverse discrete cosine transform on the received block of numerical values. The inverse discrete cosine transformed block of numerical values may comprise a corresponding block of YUV information associated with the 8×8 pixel block 214. The YUV information resulting from the inverse discrete cosine transformation may be stored in memory.

The 8×8 pixel block 214 may comprise pixels arranged in rows and columns where each row may comprise 8 pixels with 8 rows in the 8×8 block. The pixels 214a, 214b . . . 214c may represent pixels in a first row of the 8×8 block. The pixels 214d, 214e . . . 214f may represent pixels in a subsequent row of the 8×8 block. Each of the pixels in the 8×8 pixel block 214 may comprise YUV information, for example. The YUV information may be retrieved from memory and converted to an RGB representation during post-processing. During post-processing, R information may be computed based on corresponding Y, U, and/or V information. G information may be computed based on corresponding Y, U, and/or V information. B information may be computed based on corresponding Y, U, and/or V information. The resulting RGB representation of the image may be displayed on a video monitor, for example.

Figure 3:
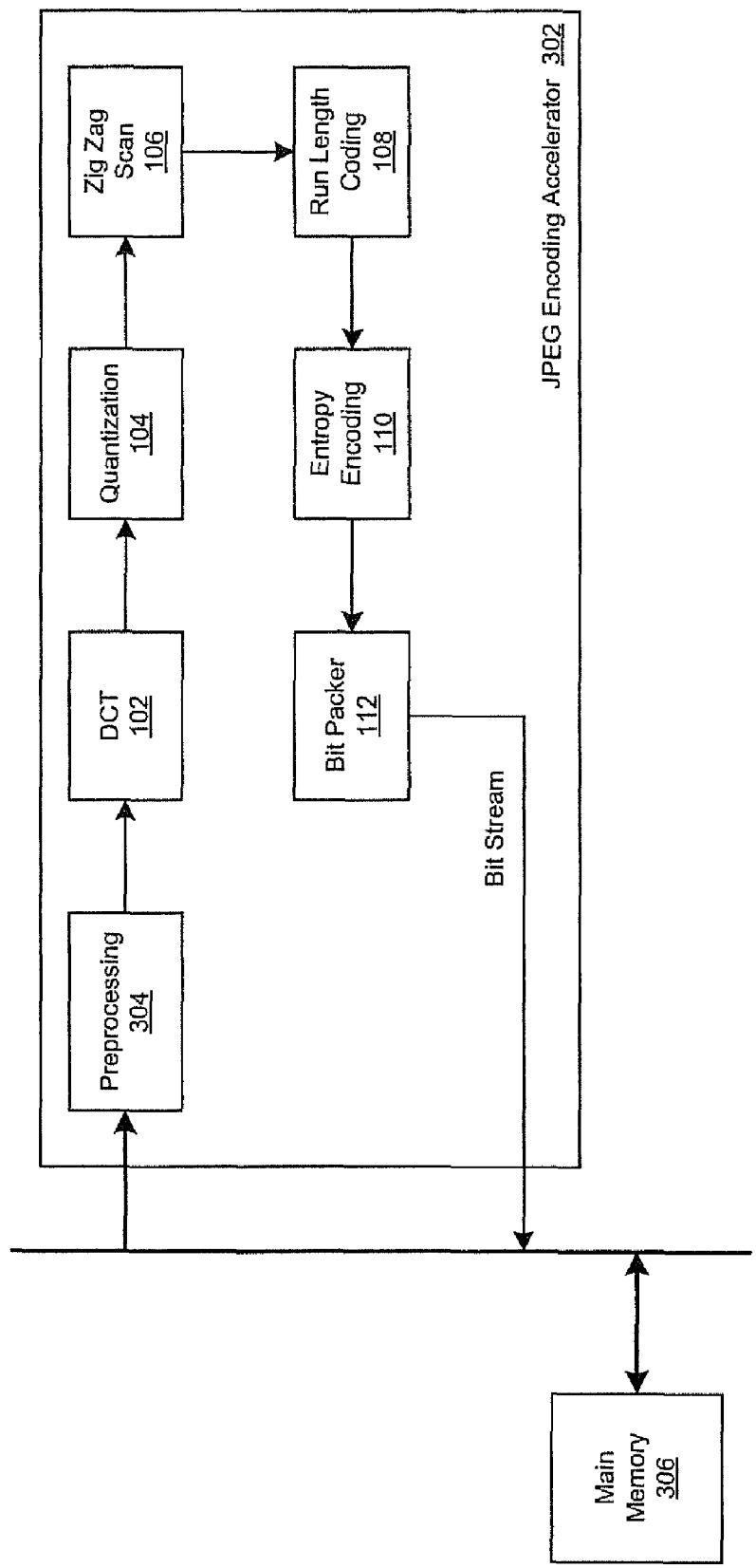
FIG. 3 is a block diagram of an exemplary JPEG encoding accelerator, in connection with an embodiment of the invention.

FIG. 3 is a block diagram of an exemplary JPEG encoding accelerator in connection with an embodiment of the invention. Referring to FIG. 3, there is shown a JPEG encoding accelerator 302, and a main memory 306. The JPEG encoding accelerator 302 may comprise a preprocessing block 304, a DCT block 102, a quantization block 104, a zig zag scan block 106, a RLC block 108, an entropy encoding block 110, and a bit packer block 112.

The preprocessing block 304 may comprise suitable logic, circuitry and/or code that may enable preprocessing of data. The preprocessing block 304 may enable conversion of an RGB data representation to a YUV data representation.

The main memory 306 may comprise suitable logic, circuitry, and/or code that may enable storing and/or retrieving of data, and/or other information that may be utilized by the JPEG encoding accelerator 302 during operations. Data stored in the main memory 306 may be byte-aligned, or word-aligned. The main memory 306 may enable storage of image data from a camera in an RGB representation, for example. The main memory 306 may enable storage of image data in a YUV representation, for example. The main memory 306 may store results of computations by the preprocessing block 304, DCT block 102, quantization block 104, zig zag scan block 106, RLC block 108, entropy encoding block 110, and/or bit packer block 112. The main memory 306 may enable retrieval of data by the preprocessing block 304, DCT block 102, quantization block 104, zig zag scan block 106, RLC block 108, entropy encoding block 110, and/or bit packer block 112.

In operation, an RGB representation of data may be retrieved from the main memory 306 by the preprocessing block 304. The preprocessing block 304 may convert the RGB representation of the data to a YUV representation of the data. The DCT 102 may enable discrete cosine transformation of the YUV representation of the data. The quantization block 104 may quantize the discrete cosine transformed data. The zig zag scan block 106 may enable conversion of the quantized data to a bit stream. The RLC block 108 may perform RLC on the bit stream. The entropy encoding block 110 may entropy encode the RLC bit stream. The bit packer 112 may byte-align and/or word-align the entropy encoded bit stream. The bit stream comprising encoded data may be stored in main memory 306.

Figure 4:
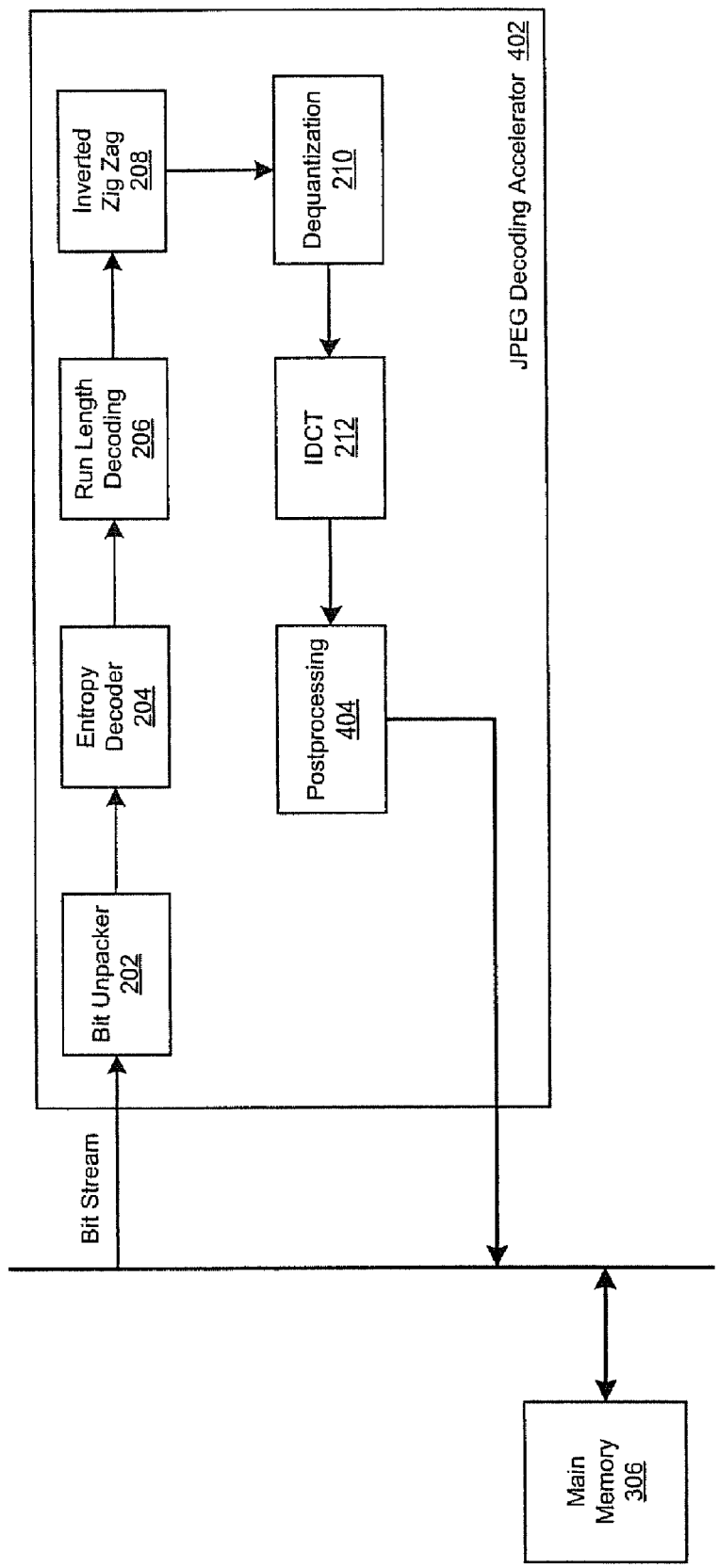
FIG. 4 is a block diagram of an exemplary JPEG decoding accelerator, in connection with an embodiment of the invention.

FIG. 4 is a block diagram of an exemplary JPEG decoding accelerator in connection with an embodiment of the invention. Referring to FIG. 4, there is shown a JPEG decoding accelerator 402, and a main memory 306. The JPEG decoding accelerator 402 may comprise a bit unpacker block 202, an entropy decoder block 204, an RLDC block 206, an inverted zig zag scan block 208, a de-quantization block 210, an IDCT block 212, and a post-processing block 404.

Each of the bit unpacker block 202, entropy decoder block 204, RLDC block 206, inverted zig zag scan block 208, de-quantization block 210, IDCT block 212 are substantially as described with regards to at least FIG. 2. The entropy decoding block 204 may comprise a Huffman decoder. The post-processing block 404 may comprise suitable logic circuitry and/or code that may enable post-processing of received data. In an exemplary embodiment of the invention, the post-processing block 404 may convert a YUV data representation to an RGB data representation.

In operation an encoded bit stream may be retrieved from the main memory 306 by the bit unpacker 202. The bit unpacker may remove stuff bits from the bit stream. The entropy decoder 204 may entropy decode the unstuffed bit stream. The RLDC block 206 may perform RLDC on the entropy decoded bit stream. The inverted zig zag block 208 may convert the bit stream into a block of binary values. The de-quantization block 210 may convert the block of binary values into corresponding block of numerical values. The IDCT block 212 may perform inverse discrete cosine transformation on the block of numerical values. The transformed block of numerical values may comprise YUV information. The post-processing block 404 may be utilized to perform post-processing of data. For example, the post-processing block 404 may convert YUV formatted data to RGB formatted data.

Figure 5A:
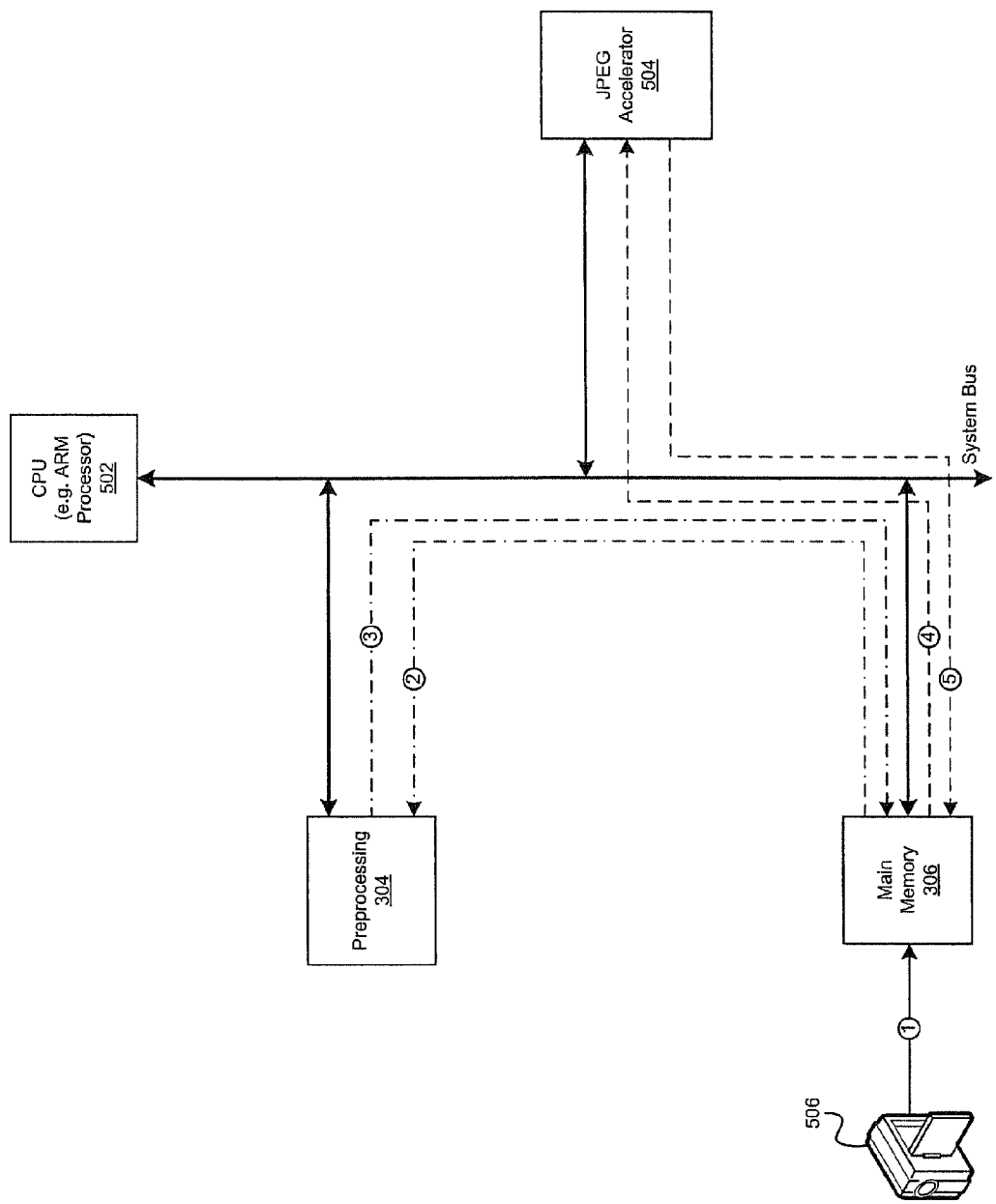
FIG. 5A is diagram illustrating exemplary steps in an encoding process, in connection with an embodiment of the invention.

FIG. 5A is a diagram illustrating exemplary steps in an encoding process in connection with an embodiment of the invention. Referring to FIG. 5A, there is shown a central processing unit (CPU) 502, a JPEG accelerator 504, a preprocessing block 304, a main memory 306, and a camera 506. The CPU 502, JPEG accelerator 504, preprocessing block 304, and/or main memory 306 may communicate via a system bus, for example.

The CPU 502 may comprise suitable logic, circuitry, and/or code that may enable execution of software, processing of data, and/or control of system operations. The CPU 502 may generate control signals and/or configuration data that may enable peripheral hardware devices to perform system operations in hardware. The CPU 502 may also receive control signals and/or data from peripheral hardware devices. Based on the received control signals and/or data, the CPU 502 may execute code, process the received data, and/or generate subsequent control signals.

In an embodiment of the invention, the CPU 502 may be implemented in an integrated circuit (IC) device. In another embodiment of the invention, the CPU 502 may be implemented as a processor core that is a component within an IC device, for example, as in a system on a chip (SoC) device. A SoC device may comprise the CPU 502, the JPEG accelerator 504, and/or the preprocessing block 304, for example.

The JPEG accelerator 504 may comprise suitable logic, circuitry and/or code that may enable execution of the functions and operation that may be handled by the JPEG encoding accelerator 302, and/or the JPEG decoding accelerator 402.

The camera 506 may comprise suitable circuitry, logic, and/or code that may enable capturing of a visual image and generation of image data. The captured visual image may be represented as a plurality of pixels arranged in rows and columns. The visual image may be captured based on a raster scan. Image data, associated with each pixel in an image frame may be generated by complementary metal oxide silicon (CMOS) circuitry in the camera 506. The camera 506 may also comprise an interface that enables storing of image data, as an RGB representation, for example, in the main memory 306.

Referring to FIG. 5A in operation, the camera 506, may capture an image and store the captured image in RGB format in main memory 306, as indicated by the reference 1 in FIG. 5A. The preprocessing block 304 may retrieve the RGB formatted data from the main memory 306, as indicated by reference 2 in FIG. 5A. The preprocessing block 304 may convert the RGB formatted data to YUV formatted data. The preprocessing block may store the YUV formatted data as indicated by reference 3 in FIG. 5A. The JPEG accelerator 504 may retrieve the YUV formatted data from the main memory 306, as indicated by the reference 4 in FIG. 5A. The JPEG accelerator 504 may encode the YUV data based on DCT and/or entropy encoding. The JPEG accelerator 504 may store the encoded YUV data in the main memory 306, as indicated by reference 5 in FIG. 5A.

Figure 5B:
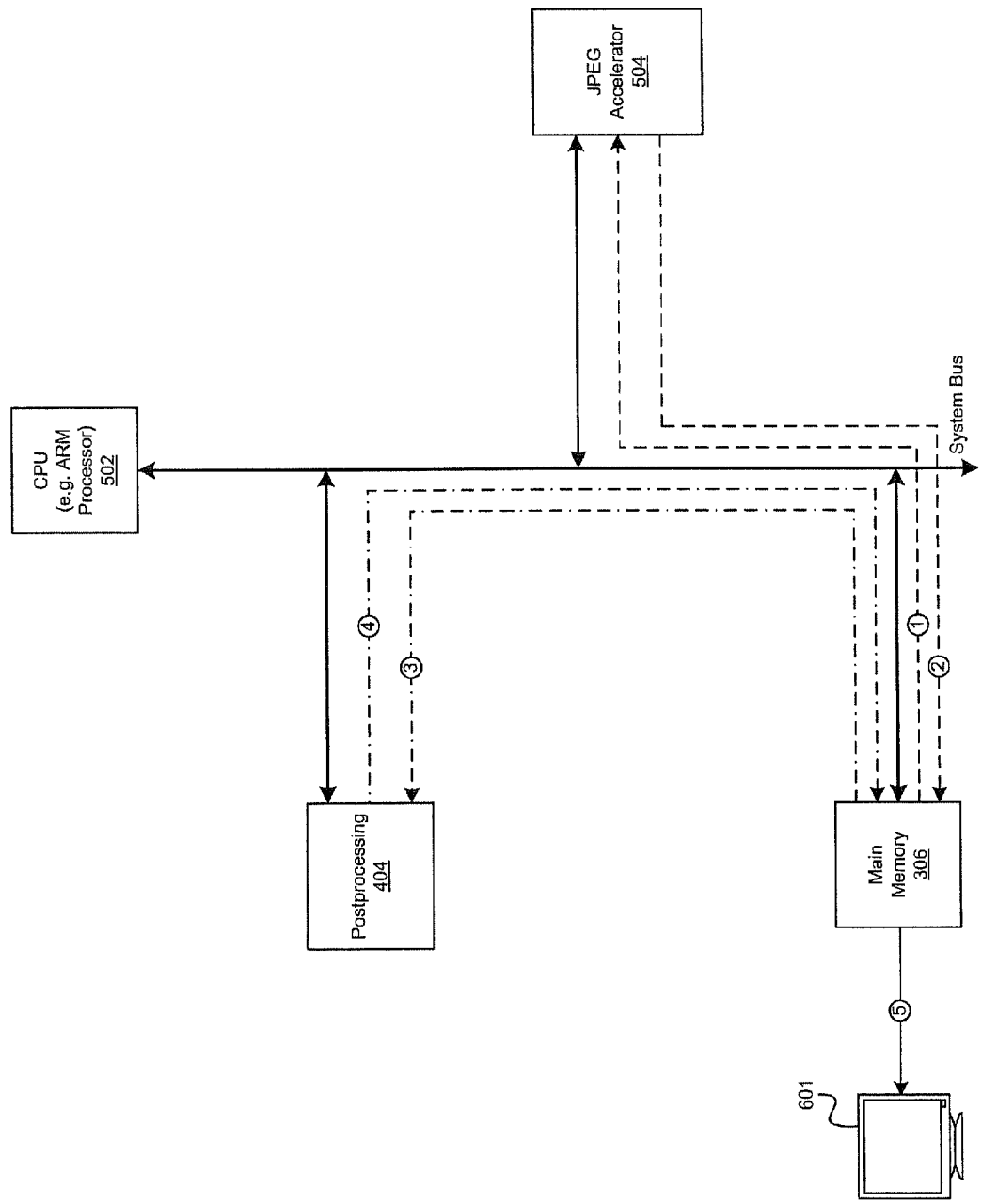
FIG. 5B is diagram illustrating exemplary steps in a decoding process, in connection with an embodiment of the invention.

FIG. 5B is a diagram illustrating exemplary steps in a decoding process in connection with an embodiment of the invention. Referring to FIG. 5B, there is shown a central processing unit (CPU) 502, a JPEG accelerator 504, a post-processing block 404, a main memory 306, and a display 601. The CPU 502, JPEG accelerator 504, preprocessing block 304, and/or main memory 306 may communicate via a system bus, for example. This central processing unit (CPU) 502, JPEG accelerator 504, post-processing block 404, and/or main memory 306 are substantially as describe with respect to FIG. 1-4.

The display 601 may comprise suitable circuitry, logic, and/or code that may be utilized to display a visual image based on image data. The displayed visual image may be represented as a plurality of pixels arranged in rows and columns. The visual image may be displayed based on a raster scan. Image data, associated with each pixel in an image frame may be displayed by the display 601, which may be, for example, a cathode ray tube (CRT), Plasma, liquid crystal diode (LCD), or other type of display. In one embodiment of the invention, the display 601 may comprise an interface that allows the image data to be retrieved from the main memory 306. For example, the display 601 may comprise and RGB interface that allows RGB formatted data to be retrieved from the main memory 306.

Referring to FIG. 5B in operation, the JPEG accelerator 504 may retrieve encoded data from the main memory 306, as indicated by reference 1 in FIG. 5B. The JPEG accelerator 504 may decode the encoded data based on IDCT and/or entropy decoding. The JPEG accelerator 504 may store the decoded data in the main memory 306, as indicated by reference 2 in FIG. 5B. The post-processing block 404 may retrieve the decoded data from the main memory 306, as indicated by reference 3 in FIG. 5B. The post-processing block may convert a YUV data representation, contained in the decoded data, to an RGB data representation. The post-processing block 404 may store the RGB data representation in the main memory 306, as represented by reference 4 in FIG. 5B. The display 601 may retrieve the RGB data representation of the decoded data from the main memory 306, as represented by reference 5 in FIG. 5B. The retrieved RGB formatted data may be displayed on the video monitor 601

Figure 6:
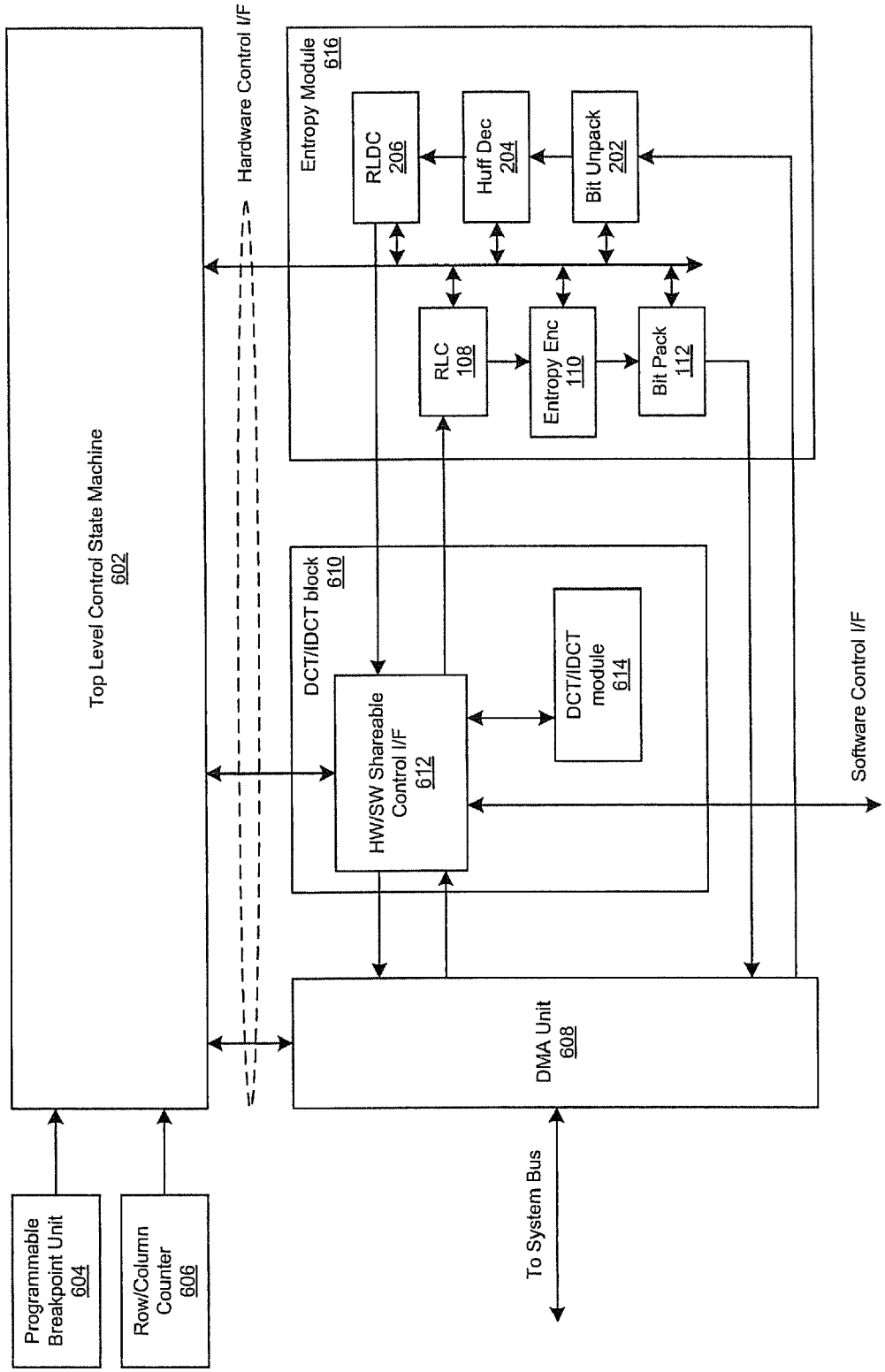
FIG. 6 is a block diagram of a system for pipelined processing in an integrated embedded image and video accelerator in accordance with an embodiment of the invention.

FIG. 6 is a block diagram of a system for pipelined processing in an integrated embedded image and video accelerator in accordance with an embodiment of the invention. The JPEG accelerator 504 may be an exemplary embodiment of an integrated embedded image and video accelerator. Referring to FIG. 6, there is shown a top-level control state machine 602, a programmable breakpoint unit 604, a row and column (row/column) counter block 606, a direct memory access (DMA) unit 608, a DCT and IDCT (DCT/IDCT) block 610, and an entropy module 616. The DCT/IDCT block 610 may comprise a hardware and software (HW/SW) sharable control interface (I/F) 612, and a DCT/IDCT module 614. The entropy coding module 616 may comprise an RLC block 108, an entropy encoding block 110, a bit packing block 112, an RLDC block 206, an entropy decoder block 204, and a bit unpacking block 202.

In some conventional JPEG encoding accelerators 302, the functions associated with the preprocessing block 304 are performed along with the functions performed by the DCT block 102, quantization block 104, zig zag scan block 106, run length coding block 108, entropy encoding block 110 and bit packer block 112. In some conventional JPEG decoding accelerators 402, the functions associated with the post-processing block 404 are performed along with the functions performed by the IDCT block 212, de-quantization block 210, inverted zig zag scan block 208, run length decoding block 206, entropy decoder block 204 and bit unpacker block 202.

Various embodiments of the invention may comprise a system for programmable breakpoints in an integrated embedded image and video accelerator that performs functions by the DCT block 102, IDCT block 212, quantization block 104, de-quantization block 210, zig zag scan block 106, inverted zig zag scan block 208, RLC block 108, RLDC block 206, entropy encoding block 110, entropy decoder block 204, bit packer block 112, and/or bit unpacker block 202.

In various embodiments of the invention, the preprocessing block 304 may be more easily utilized by other applications in an IV system that may not be related to JPEG encoding and/or decoding, for example video previewing. Various embodiments of the invention may also reduce complexity associated with a JPEG accelerator 504 when compared to a JPEG encoding accelerator 302 and/or JPEG decoding accelerator 402.

Various embodiments of the invention may also comprise a system for programmable breakpoints in an integrated embedded image and video accelerator that may be controlled by code or software via a software interface. This capability may enable the functionality of a JPEG accelerator 504 to be adaptable to performing new functions as may be required by new applications and/or new products.

The top-level control state machine 602 may comprise suitable logic, circuitry, and/or code that may enable controlling of the operation of the DMA unit 608, the DCT/IDCT block 610, and/or the entropy coding module 616 via a hardware control I/F. The top-level control state machine 602 may also receive status information from the DMA unit 608, the DCT/IDCT block 610, and/or the entropy coding module 616 via the hardware control I/F. The top-level control state machine 602 may receive control signals from the programmable breakpoint unit 604 and/or the row/column counter block 606. The top-level control state machine 602 may receive control information from the CPU 502 via a software control I/F. The top-level control state machine 602 may also communicate status information to the CPU 502 via the software control I/F.

For the encoding operation, the CPU 502 may send control signals to the top-level control state machine 602 that enables the JPEG accelerator 504 to encode an image stored in the main memory 306. The top-level control state machine 602 may determine when the JPEG accelerator 504 is to receive a current 8×8 pixel block 100 from the main memory 306. The top-level control state machine 602 may send control signals that enable the DMA unit 608 to retrieve the current 8×8 pixel block 100 from the main memory 306. The retrieved current 8×8 pixel block 100 may be transferred to the DCT/IDCT block 610. The top-level control state machine 602 may send control signals that may enable the DCT/IDCT block 610 to transform and/or quantize the received current 8×8 pixel block 100. The DMA unit 608 may retrieve a subsequent 8×8 pixel block 100 from the main memory 306 while the DCT/IDCT block 610 performs transformation and/or quantization operations on the subsequent 8×8 block 100. The top-level control state machine 602 may receive status information from the DCT/IDCT block 610 that indicates completion of transformation and quantization of the retrieved 8×8 pixel block 100 and generation of a corresponding transformed current 8×8 block.

The top-level control state machine 602 may send control signals that may enable the entropy coding module 616 to perform RLC, entropy coding and/or bit packing on the transformed current 8×8 block. The top-level control state machine 602 may send control signals that enable the DCT/IDCT block 610 to transform and/or quantize a subsequent 8×8 pixel block 100 received from the main memory 306. The DCT/IDCT module may perform transformation and/or quantization operations on the subsequent 8×8 pixel block 100 while the entropy coding module 616 is performing RLC, entropy coding and/or bit packing on the transformed current 8×8 block. The top-level control state machine 602 may receive status information from the entropy coding module 616 that indicates completion of RLC, entropy encoding and/or bit packing on the transformed current 8×8 block and generation of a corresponding encoded bit stream. The top-level control state machine 602 may send control signals that enable the DMA unit 608 to store the encoded bit stream in the main memory 306. The top-level control state machine 602 may subsequently send status information to the CPU 502 to indicate that at least a portion of the image stored in the main memory 306 has been encoded.

The ability of the JPEG accelerator 504, for example, to perform transformation and/or quantization operations on a subsequent 8×8 block in the DCT/IDCT block 610 while the entropy coding module 616 performs RLC, entropy encoding, and/or bit packing operations on a transformed current 8×8 block may be referred to as pipelined processing.

For the decoding operation, the CPU 502 may send control signals to the top-level control state machine 602 that enable the JPEG accelerator 504 to decode encoded data stored in the main memory 306. The top-level control state machine 602 may determine when the JPEG accelerator 504 is to receive a current encoded bit stream from main memory 306. The top-level control state machine 602 may send control signals that enable the DMA unit 608 to retrieve the current encoded bit stream from the main memory 306. The current encoded bit stream may be transferred to the entropy coding module 616.

The top-level control state machine 602 may send control signals that may enable the entropy coding module 616 to perform bit unpacking, entropy decoding and/or RLDC on the current encoded bit stream. The DMA unit 608 may retrieve a subsequent encoded bit stream from the main memory 306 while the entropy coding module 616 performs bit unpacking, entropy decoding and/or RLDC on the current encoded bit stream. The top-level control state machine 602 may receive status information from the entropy coding module 616 that indicates completion of bit unpacking, entropy decoding, and/or RLDC on the current encoded bit stream and generation of a corresponding decoded current encoded bit stream.

The top-level control state machine 602 may send control signals that may enable the DCT/IDCT block 610 to perform IDCT and/or inverse quantization on the decoded current encoded bit stream. The top-level control state machine 602 may send control signals that enable the entropy coding module 616 to perform bit unpacking, entropy decoding and/or RLDC on a subsequent encoded bit stream received from the main memory 306. The entropy coding module 616 may perform bit unpacking, entropy decoding and/or RLDC operations on the subsequent encoded bit stream while the DCT/IDCT block 610 may perform inverse transformation and/or inverse quantization operations on the decoded current encoded bit stream.

The top-level control state machine 602 may receive status information from the DCT/IDCT block 610 that indicates completion of IDCT and/or inverse quantization of the decoded current encoded bit stream and generation of a decoded 8×8 pixel block 214. The top-level control state machine 602 may send control signals that enable the DMA unit 608 to store the decoded 8×8 pixel block 214 in the main memory 306. The top-level control state machine 602 may subsequently send status information to the CPU 502 to indicate that at least a portion of the encoded data associated with an image has been decoded and/or stored in the main memory 306.

The ability of the JPEG accelerator 504, for example, to perform bit unpacking, entropy decoding and/or RLDC on a subsequent encoded bit stream in the entropy coding module 616 while the DCT/IDCT block 610 performs IDCT and/or inverse quantization operations on a decoded current encoded bit stream may also be referred to as pipelined processing.

The programmable breakpoint unit 604 may comprise suitable logic, circuitry, and/or code that may be utilized to generate an indication that the JPEG accelerator 504 has completed transformation and encoding processing of a specific 8×8 pixel block 100. Transformation processing may comprise DCT and/or quantization. Encoding processing may comprise RLC, entropy encoding, and/or bit packing. The programmable breakpoint unit 604 may also be utilized to generate an indication that the JPEG accelerator 504 has completed decoding and inverse transformation processing of a specific 8×8 pixel block 214. Decoding processing may comprise bit unpacking, entropy decoding and/or RLDC. Inverse transformation processing may comprise inverse quantization and/or IDCT.

The row/column counter block 606 may comprise suitable logic, circuitry, and/or code that may be utilized to indicate a current row and/or current column location associated with an 8×8 pixel block 100 and/or 8×8 pixel block 214 in a picture or a video frame. For the encoding operation, the row/column counter block 606 may indicate a current row and/or column location associated with an 8×8 pixel block 100 in an image or a video frame. For the decoding operation, the row/column counter block 606 may indicate a current row and/or column location associated with an 8×8 pixel block 214 in a picture or a video frame.

The DMA unit 608 may comprise suitable logic, circuitry, and/or code that may enable retrieval and/or storing of a block of data from/to the main memory 306, respectively. The DMA unit 608 may receive control signals from the top-level control state machine 602 that enables a block of data to be retrieved and/or stored from/to the main memory 306, respectively. The DMA unit 608 may retrieve and/or store a block of data from/to the main memory 306 via a system bus. The DMA unit 608 may receive control signals from the top level control state machine that enable a block of data to be retrieved and/or stored from/to the DCT/IDCT block 610. The DMA unit 608 may send status information to the top-level control state machine 602 that indicates when a block of data has been retrieved and/or stored from/to the main memory 306. The DMA unit 608 may send status information to the top-level control state machine 602 that indicates when a block of data has been retrieved and/or stored from/to the DCT/IDCT block 610.

The ability of the JPEG accelerator 504, for example, to retrieve and/or store a block of data from/to the main memory 306 in the DMA 608 unit while DCT/IDCT 610 performs transformation and/or quantization operations on a subsequent 8×8 block may be referred to as pipelined processing.

In decoding processing, the ability of the JPEG accelerator 504, for example, to perform inverted quantization and/or transformation operations on a subsequent 8×8 block in DCT/IDCT 610 while DMA 608 retrieves and/or stores a block of data from/to the main memory 306 may also be referred to as pipelined processing.

The DCT/IDCT block 610 may comprise suitable logic, circuitry, and/or code that may enable DCT, IDCT, quantization, and/or inverse quantization on received data. The operation of the DCT/IDCT block 610 may be controlled by the HW/SW sharable control I/F 612, via a programmable interface. The DCT/IDCT module 614 may perform DCT, IDCT, quantization, and/or inverse quantization processing.

The HW/SW sharable control I/F 612 may comprise suitable logic, circuitry, and/or code that may enable operation of the DCT/IDCT module 614. The HW/SW sharable control I/F 612 may receive control signals from the top-level control state machine 602 and/or from the CPU 502. The HW/SW sharable control I/F 612 may also send status information to the top-level control state machine 602 and/or to the CPU 502. The received control signals may enable the HW/SW sharable control I/F 612 to receive and/or send an 8×8 block of data. The received control signals may also enable the HW/SW sharable control I/F 612 to receive and/or send a bit stream. The received control signals may also enable the HW/SW sharable control I/F 612 to send control signals and/or data to the DCT/IDCT module 614.

For the encoding operation the HW/SW sharable control I/F 612 may send an 8×8 block of data to the DCT/IDCT module 614 for transformation processing. At the completion of transformation processing on the 8×8 block of data, the HW/SW sharable control I/F 612 may receive a corresponding transformed block of data from the DCT/IDCT module 614. For the decoding operation the HW/SW sharable control I/F 612 may send an 8×8 block of data to the DCT/IDCT module 614 for inverse transformation processing. At the completion of inverse transformation processing on the 8×8 block of data, the HW/SW sharable control I/F 612 may receive a corresponding inverse transformed block of data from the DCT/IDCT module 614.

The DCT/IDCT module 614 may comprise suitable logic, circuitry, and/or code that may be utilized to perform DCT, IDCT, quantization, and/or inverse quantization processing of received data. The DCT/IDCT module 614 may receive control signals and/or data from the HW/SW sharable control I/F 612.

For the encoding operation the HW/SW sharable control I/F 612 may send control signals and/or at least a portion of an 8×8 block of data to the DCT/IDCT module 614. The DCT/IDCT module 614 may perform DCT and/or quantization processing on the received at least a portion of the 8×8 block of data. Upon completion of DCT and/or quantization processing, the DCT/IDCT module 614 may send status information and/or a corresponding transformed portion of the 8×8 block of data to the HW/SW sharable control I/F 612.

For the decoding operation, the HW/SW sharable control I/F 612 may send control signals and/or at least a portion of an 8×8 block of data to the DCT/IDCT module 614. The DCT/IDCT module 614 may perform inverse quantization and/or IDCT processing on the received at least a portion of the 8×8 block of data. Upon completion of inverse quantization and/or IDCT processing, the DCT/IDCT module 614 may send status information and/or a corresponding inverse transformed portion of the 8×8 block of data to the HW/SW sharable control I/F 612.

The entropy coding module 616 may comprise suitable logic, circuitry, and/or code that may enable RLC, RLDC, entropy encoding, entropy decoding, bit packing, and/or bit unpacking operation on received data. The RLC block 108, entropy encoding block 110, the bit packer block 112, the bit unpacker block 202, the entropy decoder block 204, and the RLDC block 206 may each receive control signals from the top-level control state machine 602. The control signals the RLC block 108, entropy encoding block 110, bit packer block 112, bit unpacker block 202, entropy decoder block 204, and/or RLDC block 206 to perform their respective function on received data. The RLC block 108, entropy encoding block 110, the bit packer block 112, the bit unpacker block 202, the entropy decoder block 204, and the RLDC block 206 may also send status information to the top-level control state machine 602. The control signals may also enable the RLC block 108 to send data to the entropy encoding block 110. The control signals may enable the entropy encoding block 110 to send data to the bit packer block 112. The control signals may enable the bit unpacker block 202 to send data to the entropy decoder block 204. The control signals may enable the entropy decoder block 204 to send data to the RLDC block 206. The status information may be utilized by the RLC block 108, entropy encoding block 110, bit packer block 112, bit unpacker block 202, entropy decoder block 204, and/or RLDC block 206 to indicate completion of processing of received data to the top-level control state machine 602.

For the encoding operation, the RLC block 108 may perform an RLC operation on a current bit stream to generate an RLC current bit stream. The entropy encoding block 110 may perform entropy encoding on an RLC current bit stream received from the RLC block 108. The entropy encoding block 110 may generate an entropy encoded current bit stream. While the entropy encoding block 110 is performing entropy encoding on the RLC current bit stream, the RLC block 108 may perform an RLC operation on a subsequent bit stream to generate an RLC subsequent bit stream. The bit packer block 112 may insert stuff bits into an entropy encoded current bit stream received from the entropy encoding block 110. While the bit packer block 112 may insert stuff bits into an entropy encoded current bit stream, the entropy encoding block 110 may perform an entropy encoding operation on an RLC subsequent bit stream.

The ability of the RLC block 108 to perform RLC operations on a subsequent bit stream while the entropy encoding block 110 performs entropy encoding operations on an RLC current bit stream may be referred to as pipelined processing. The ability of the bit packing block 112 to insert stuff bits into an entropy encoded current bit stream while the entropy encoding block 110 performs entropy encoding operations on an RLC subsequent bit stream may also be referred to as pipelined processing.

For the decoding operation, the bit unpacking block 202 may remove stuff bits from a current encoded bit stream to generate an unstuffed current encoded bit stream. The entropy decoder block 204 may perform entropy decoding on the unstuffed current encoded bit stream to generate an entropy decoded current encoded bit stream. While the entropy decoder block 204 is performing entropy decoding on the unstuffed current encoding bit stream, the bit unpacking block 202 may remove stuff bits from a subsequent encoded bit stream. The RLDC block 206 may perform an RLDC operation on an entropy decoded current encoded bit stream. While the RLDC block 206 performs RLDC operations on the entropy decoded current encoded bit stream, the entropy decoder block 204 may perform entropy decoding operations on the unstuffed subsequent encoded bit stream.

The ability of the bit unpacking block 202 to remove stuff bits from a subsequent encoded bit stream while the entropy decoder block 204 performs entropy decoding operations on an unstuffed current encoded bit stream may be referred to as pipelined processing. The ability of the entropy decoder block 204 to perform entropy decoding on an unstuffed subsequent encoded bit stream while the RLDC block 206 performs RLDC operations on an entropy decoded current encoded bit stream may also be referred to as pipelined processing.

In operation, the CPU 502 may send control signals to the top level state machine 602 via the software control I/F. The control signals may instruct the JPEG accelerator 504 to encode an image stored in the main memory 306. The row/column counter 606 may comprise information indicating what portion of the image has been transformed by the DCT/IDCT block 610. The row/column counter 606 may also comprise information indicating what portion of the transformed image has currently been encoded by the entropy coding module 616. Status information from the programmable breakpoint unit 604 and/or the row/column counter 606 may be utilized by the top-level control state machine 602 to generate control signals and/or status information.

The top-level control state machine 602 may select an 8×8 pixel block 100 from the stored image. The top-level control state machine 602 may configure the programmable breakpoint unit 604 to generate status information to indicate when the DCT/IDCT block 610 has completed transform operations on the selected 8×8 pixel block 100. The programmable breakpoint unit may also be configured to generate status information to indicate when the entropy coding module 616 has completed encoding operations on a transformed selected 8×8 block.

For the encoding operation, the top-level control state machine 602 may generate control signals that enable the DMA unit 608 to transfer data from the selected 8×8 pixel block 100 from the main memory 306, to the HW/SW sharable control I/F block 612. The HW/SW sharable control I/F block 612 may enable the DCT/IDCT module 614 to perform DCT and quantization operations on the selected 8×8 pixel block 100. The transformed selected 8×8 block may be stored in the HW/SW sharable control I/F block 612. The top-level control state machine 602 may generate control signals that enable the DCT/IDCT block 610 to transfer at least a portion of the transformed selected 8×8 block to the RLC block 108. The top-level control state machine 602 may generate control signals that enable the RLC block 108, encoding block 110, and/or the bit packer block 112 to perform encoding operations on the transformed selected 8×8 block. Upon completion of encoding operations on the transformed selected 8×8 block, the top-level control state machine 602 may send control signals that enable the DMA unit 608 to transfer an encoded bit stream from the bit packer block 112 to the main memory 306. The top-level control state machine 602 may send status information to the CPU 502 if the current block is the target block specified in the programmable breakpoint unit 604.

For the decoding operation, the top-level control state machine 602 may generate control signals that enable the DMA unit 608 to transfer encoded data from the main memory 306, to the bit unpacker block 202. The top-level control state machine 602 may generate control signals that enable the bit unpacker block 202, the entropy decoder block 204, and/or the RLDC block 206 to perform decoding operations on the transferred encoded data. Upon completion of decoding operations on the transferred encoded data, the top-level control state machine 602 may generate control signals that enable the entropy coding module 616 to transfer at least a portion of a decoded bit stream to the HW/SW sharable control I/F block 612.

The HW/SW sharable control I/F block 612 may enable the DCT/IDCT module 614 to perform IDCT and inverse quantization operations on the decoded bit stream. An inverse transformed 8×8 block may be stored as a decoded 8×8 pixel block 214 in the HW/SW sharable control I/F block 612. The top-level control state machine 602 may generate control signals that enable the DMA unit 608 to transfer the decoded 8×8 pixel block 214 from the HW/SW sharable control I/F block 612 to the main memory 306.

Upon completion of inverse transformation operations on the decoded 8×8 pixel block 214, the programmable breakpoint unit 604 may send status information to the top-level control state machine 602. The top-level control state machine 602 may send control signals that enable the DMA unit 608 to transfer the decoded 8×8 pixel block 214 from the HW/SW sharable control I/F block 612 to the main memory 306. The top-level control state machine 602 may send status information to the CPU 502.

The software control I/F may enable the CPU 502 to provide control signals to the HW/SW sharable control I/F 612. By utilizing this interface, the DCT/IDCT block 610 may perform operations under software control. For example, utilizing the software control I/F to the HW/SW sharable control I/F 612 may enable the DCT/IDCT block 610 to act as a standalone DCT/IDCT accelerator performing a DCT/IDCT function requested by an application running on CPU 502.

Figure 7:
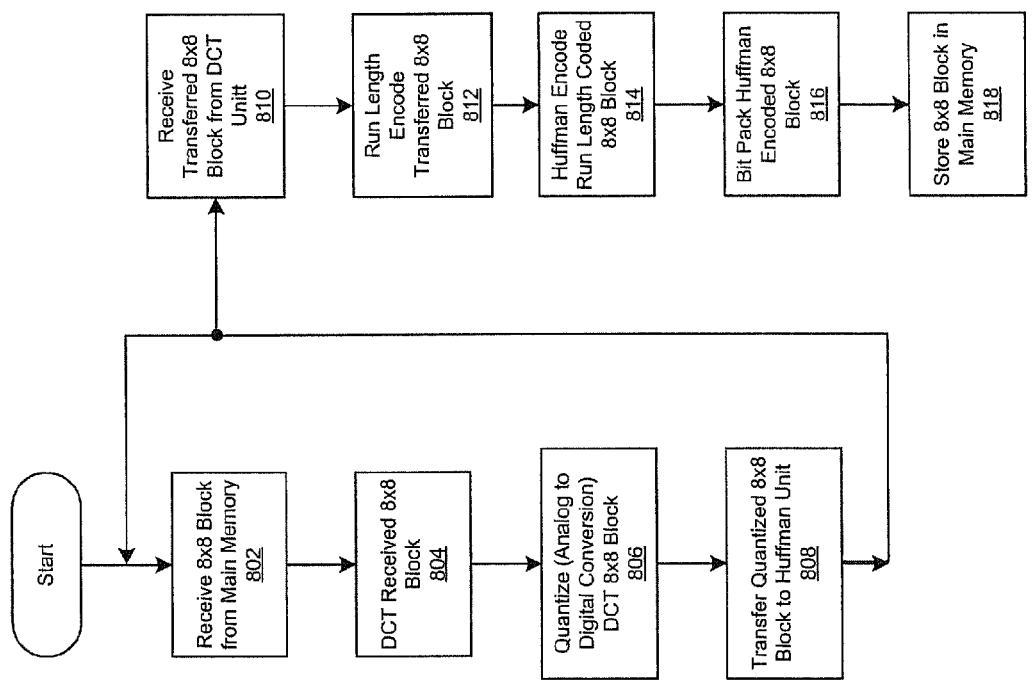
FIG. 7 is a flow chart illustrating exemplary steps for an encoding process in accordance with an embodiment of the invention.

FIG. 7 is a flow chart illustrating exemplary steps for an encoding process in accordance with an embodiment of the invention. Referring to FIG. 7, in step 802, an 8×8 block may be received from main memory 306 by the JPEG accelerator 504. In step 804, DCT operations may be performed on the received 8×8 block. In step 806, quantization operations may be performed on the transformed 8×8 block. The quantization operations may be equivalent to an analog to digital conversion. In step 808, the quantized 8×8 block may be transferred from the DCT/IDCT module 610 to the entropy module 616.

Steps 802, 804, 806 and/or 808 may next be performed simultaneously while steps 810, 812, 814, 816 and/or 818 are performed. In step 802, a subsequent 8×8 block may be transferred from the main memory 306 while in step 810, the transferred 8×8 block from the DCT/IDCT module 610 may be received at the entropy module 616. In step 812, the transferred 8×8 block may be run length coded (RLC). In step 814, the RLC 8×8 block may be entropy encoded, for example. Huffman encoding is an example of entropy encoding. In step 816, bit stuffing operations may be performed on the encoded 8×8 block. In step 818, the encoded 8×8 block may be stored in main memory 306.

Figure 8:
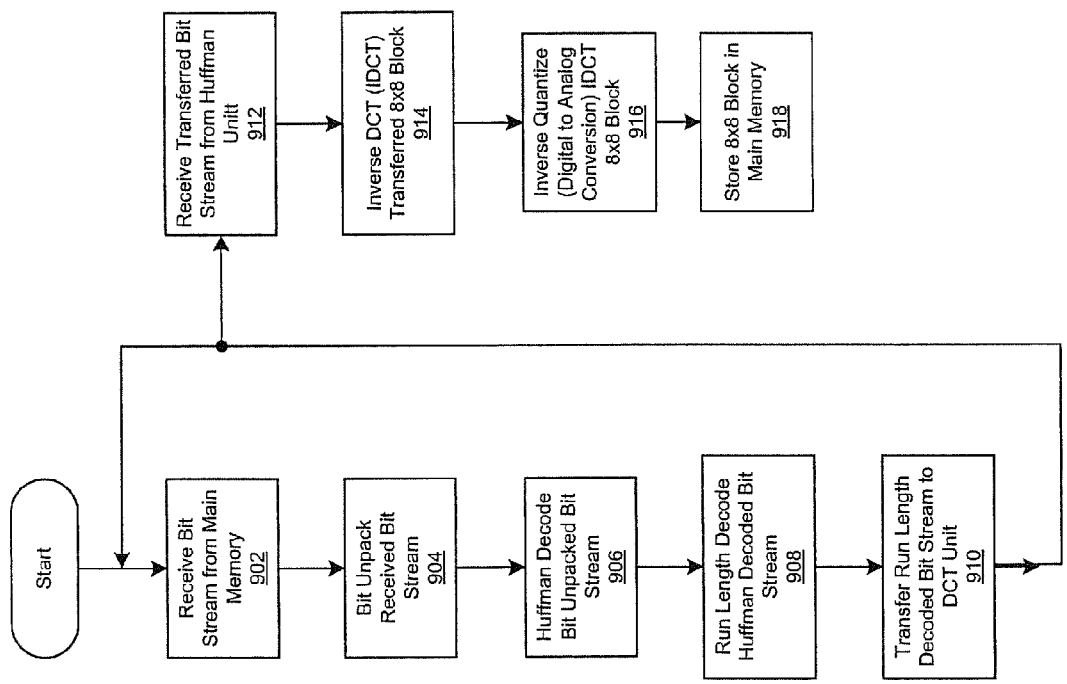
FIG. 8 is a flow chart illustrating exemplary steps for a decoding process in accordance with an embodiment of the invention.

FIG. 8 is a flow chart illustrating exemplary steps for a decoding process in accordance with an embodiment of the invention. Referring to FIG. 8, in step 902, a bit stream may be received from main memory 306 by the JPEG accelerator 504. In step 904, bit unstuffing operations may be performed on the received bit stream. In step 906, entropy decoding may be performed on the bit unpacked bit stream, for example. Entropy decoding is an example of entropy decoding. In step 908, run length decoding operations may be performed on the entropy decoded bit stream, for example. In step 910, the run length decoded bit stream may be transferred to the DCT/IDCT module 610 from the entropy module 616. Steps 902, 904, 906, 908 and/or 910 may next be performed simultaneously while steps 912, 914, 916 and/or 918 are performed. In step 902, a subsequent bit stream may be transferred from the main memory 306 while in step 912, the transferred run length decoded bit stream may be transferred from the entropy module 716 and received by the DCT/IDCT module 610. The bit stream may be processed by the DCT/IDCT module 610 as an 8×8 block. In step 914 IDCT may be performed on the 8×8 block. In step 916, inverse quantization may be performed on the inverse transformed 8×8 block. The inverse quantization may be equivalent to a digital to analog conversion. In step 918, the processed 8×8 block may be stored in the main memory 306.

Aspects of a system for pipelined processing in an integrated embedded image and video accelerator may include a DMA unit 608, DCT/IDCT block 610, entropy module 616, and top level control state machine 602 that enable pipeline processing of video data within a single chip. The pipeline processing may further comprise transformation, within the single chip, of a block of the video data while simultaneously encoding, within the single chip, a previously transformed block of video data. At least a portion of the transforming of the block of video data may occur at a time instant that corresponds to at least a portion of the encoding of the previously transformed block of video data.

The DCT/IDCT module 614 may enable discrete cosine transformation of the block of video data. The DCT/IDCT module 614 may enable quantization of at least a portion of the discrete cosine transformed block of video data. The DCT/IDCT module 614 may enable determination of a binary value for the quantized portion or more of the discrete cosine transformed blocks of video data based on a corresponding numerical value. The entropy module 616 may enable run length encoding of at least a portion of the previously transformed block of video data while simultaneously entropy encoding a previous run length encoded portion or more of the previously transformed block of video data.

Aspects of a system for pipelined processing in an integrated embedded image and video accelerator may include a DMA unit 608, DCT/IDCT block 610, entropy module 616, and top level control state machine 602 that enable pipeline processing of video data within a single chip. The pipeline processing may further comprise decoding, within the single chip, of a block of video data while simultaneously inverse transforming a previously decoded block of video data.

At least a portion of the decoding of the block of video data may occur at a time instant that corresponds to at least a portion of the inverse transforming of the previously decoded block of video data. The entropy module 616 may enable entropy decoding of at least a portion of the block of video data while simultaneously run length decoding a previous entropy decoded portion of more of the block of video data. The DCT/IDCT module 614 may enable inverse quantization of the previously decoded block of video data. The DCT/IDCT module 614 may enable determination of a numerical value for the inverse quantized previously decoded block of video data based on a corresponding binary value. The DCT/IDCT module 614 may enable inverse discrete cosine transformation of the inverse quantized previously decoded block of video data.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for generating signals in a wireless communication system, the method comprising:
   receiving data via an external interface to a single chip;
   generating transformed data by performing one or more transform operations on said received data within said single chip;
   selectively performing within said single chip:
      generating coded data by performing one or more coding operations on said transformed data; and
      transmitting said transformed data via said external interface; or
      transmitting said coded data via said external interface; and
   generating status information associated with the completion of one or both of said one or more transform operations and said one or more coding operations for a specified portion of said received data.

2. The method according to claim 1, wherein said one or more transform operations comprise a discrete cosine transform operation.

3. The method according to claim 1, wherein said one or more transform operations comprise an inverse discrete cosine transform operation.

4. The method according to claim 1, wherein said one or more coding operations comprise run length coding, entropy encoding and/or bit packing operations.

5. The method according to claim 1, wherein said one or more coding operations comprise run length decoding, entropy decoding and/or bit unpacking operations.

6. The method according to claim 1, comprising performing said one or more coding operations while concurrently performing said one or more transform operations on subsequent received data.

7. The method according to claim 1, comprising receiving a data block via said received data, wherein said data block comprises a portion of a data frame.

8. The method according to claim 7, comprising generating control signals upon completion of said one or more transform operations on said data block.

9. The method according to claim 7, comprising determining a location of said data block within said data frame.

10. The method according to claim 9, comprising comparing said location to a specified target block location within said data frame.

11. The method according to claim 10, comprising generating status information based on said comparing.

12. A system for generating signals in a wireless communication system, the system comprising:
one or more circuits within a single chip, wherein said one or more circuits enable reception of data via an external interface to said single chip;
said one or more circuits enable generation of transformed data by performing one or more transform operations on said received data within said single chip;
said one or more circuits enable selective performing, within said single chip, of:
generation of coded data by performing one or more coding operations on said transformed data; and
transmission of said transformed data via said external interface; or
transmission of said coded data via said external interface; and
said one or more circuits enable generation of status information associated with the completion of one or both of said one or more transform operations and said one or more coding operations for a specified portion of said received data.

13. The system according to claim 12, wherein said one or more transform operations comprise a discrete cosine transform operation.

14. The system according to claim 12, wherein said one or more transform operations comprise an inverse discrete cosine transform operation.

15. The system according to claim 12, wherein said one or more coding operations comprise run length coding, entropy encoding and/or bit packing operations.

16. The system according to claim 12, wherein said one or more coding operations comprise run length decoding, entropy decoding and/or bit unpacking operations.

17. The system according to claim 12, wherein said one or more circuits enable performing of said one or more coding operations while concurrently performing said one or more transform operations on subsequent received data.

18. The system according to claim 12, wherein said one or more circuits enable reception of a data block via said received data, wherein said data block comprises a portion of a data frame.

19. The system according to claim 18, wherein said one or more circuits enable generation of control signals upon completion of said one or more transform operations on said data block.

20. The system according to claim 18, wherein said one or more circuits enable determination of a location of said data block within said data frame.

21. The system according to claim 20, wherein said one or more circuits enable comparing of said location to a specified target block location within said data frame.

22. The system according to claim 21, wherein said one or more circuits enable generation of status information based on said comparing.

* * * * *